（12）United States Patent
Kannan et al.

(10) Patent No.: US 12,014,453 B2
(45) Date of Patent: Jun. 18, 2024

(54) METHOD AND ELECTRONIC DEVICE FOR AUTOMATICALLY ANIMATING GRAPHICAL OBJECT

(71) Applicant: SAMSUNG ELECTRONICS CO., LTD., Suwon-si (KR)

(72) Inventors: Ramasamy Kannan, Bangalore (IN); Vishakha S. R., Sagar (IN); Sagar Aggarwal, New Delhi (IN); Lokesh Rayasandra Boregowda, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 17/708,810

(22) Filed: Mar. 30, 2022

(65) Prior Publication Data

US 2022/0319085 A1 Oct. 6, 2022

Related U.S. Application Data

(63) Continuation of application No. PCT/KR2022/004077, filed on Mar. 23, 2022.

(30) Foreign Application Priority Data

Mar. 30, 2021 (IN) .............................. 202141014476
Aug. 31, 2021 (IN) .............................. 202141014476

(51) Int. Cl.
*G06T 13/00* (2011.01)
*G06T 7/20* (2017.01)
(Continued)

(52) U.S. Cl.
CPC ............... *G06T 13/00* (2013.01); *G06T 7/20* (2013.01); *G06V 10/761* (2022.01); *G10L 25/18* (2013.01);
(Continued)

(58) Field of Classification Search
None
See application file for complete search history.

(56) References Cited

U.S. PATENT DOCUMENTS 6,369,822 B1 * 4/2002 Peevers ................. G06T 13/205
704/E21.02
8,867,891 B2 10/2014 Jiang et al.
(Continued)

FOREIGN PATENT DOCUMENTS

KR 10-2017-0069790 A 6/2017

OTHER PUBLICATIONS

International Search Report and Written Opinion issued Jun. 30, 2022 by the International Searching Authority in counterpart International Patent Application No. PCT/KR2022/004077. (PCT/ISA/220, PCT/ISA/210 and PCT/ISA/237).

*Primary Examiner* — Patrick F Valdez
(74) *Attorney, Agent, or Firm* — Sughrue Mion, PLLC (57) ABSTRACT

A method for animating a graphical object by an electronic device is provided. The method includes receiving, by the electronic device, the graphical object having at least one predefined portion to animate. The method includes receiving, by the electronic device, an audio to obtain spectral frequencies of the audio. The method includes determining, by the electronic device, at least one of an intensity of the spectral frequencies and at least one range of the spectral frequencies. The method includes generating, by the electronic device, at least one motion on the at least one predefined portion of the graphical object based on the at least one of the intensity of the spectral frequencies and the at least one range of the spectral frequencies.

8 Claims, 8 Drawing Sheets

(51) Int. Cl.
    *G06V 10/74*     (2022.01)
    *G10L 25/18*     (2013.01)
    *G10L 25/57*     (2013.01)

(52) U.S. Cl.
    CPC .... *G10L 25/57* (2013.01); *G06T 2207/10016* (2013.01)

(56) References Cited

U.S. PATENT DOCUMENTS

| | | |
|---|---|---|
| 9,563,265 B2 | 2/2017 | You et al. |
| 9,594,473 B2 * | 3/2017 | Lee .................. G06F 3/0482 |
| 10,360,716 B1 * | 7/2019 | van der Meulen ..... G10L 25/57 |
| 2009/0292993 A1 | 11/2009 | Ulrich et al. |
| 2013/0141439 A1 * | 6/2013 | Kryzhanovsky ........ G06T 13/80 345/473 |
| 2013/0182858 A1 | 7/2013 | You et al. |
| 2018/0249276 A1 | 8/2018 | Godfrey |
| 2020/0312347 A1 | 10/2020 | Mate et al. |
| 2020/0342646 A1 * | 10/2020 | Wang .................. G06N 3/045 |
| 2023/0239643 A1 * | 7/2023 | Nam ................. H04N 21/4394 348/515 |

* cited by examiner

FIG. 9

METHOD AND ELECTRONIC DEVICE FOR AUTOMATICALLY ANIMATING GRAPHICAL OBJECT

CROSS-REFERENCE TO RELATED APPLICATIONS

This application is a Continuation Application of International Application PCT/KR2022/004077 filed on Mar. 23, 2022, which claims benefit of priority from Indian Patent Application No. 202141014476, filed on Aug. 31, 2021, in the Indian Patent Office, and from Indian Patent Application No. 202141014476, filed on Mar. 30, 2021, in the Indian Patent Office, the disclosures of which are incorporated herein in their entireties by reference.

BACKGROUND

1. Field

The disclosure relates to image processing techniques, and more particularly to a method and an electronic device for automatically animating a graphical object.

2. Description of Related Art

Graphical objects such as an augmented reality (AR) object, a virtual reality (VR) object, an emoji, a sticker, etc. are widely used in text messaging, video calls, AR/VR games, video creations, etc. Various actions and expressions of the graphical objects create a visual experience to users. In order to improve the visual experience, conventional systems analyze variations in an amplitude of an audio (e.g., speech, song, music, etc.) playing in the background at various instances of time, and make micromotions on these graphical objects based on the variation in amplitude with respect to time. However, the micromotions may depend only on the amplitude variation and not on audio spectral frequencies against the amplitude variations. For example, audio may contain a majority of bass sounds at one point, and a majority of treble sounds at some other point. Therefore, the micromotions creation without considering the audio spectral frequencies of various audio sources in the audio degrades aesthetics of an animated graphical object and visual experience of the user. As an alternate method, the conventional systems may obtain inputs from the user to make desired micromotions on the graphical objects, where a manual effort is required to make such desired micromotions on the graphical objects. Thus, it is desired to provide an improved solution for animating graphical objects.

SUMMARY

Provided are a method and an electronic device for automatically animating a graphical object based on various audio spectral frequencies of sound in an audio playing in the background. The electronic device extracts spectral frequencies of a reference audio and identifies different ranges of the spectral frequencies. The different ranges of the spectral frequencies indicate various sources of sound in the reference audio. Further, the electronic device assigns a predefined motion, or a motion copied from a video, to the graphical object for a particular range of the spectral frequencies. In response to playing another audio (e.g., speech, music, song, etc.), the electronic device applies the assigned motion on the graphical object according to an intensity and ranges of the spectral frequencies in the playing audio. Thus, movements of the graphical object suit a mood created by the audio, which may improve aesthetics of an animated graphical object and visual experience of a user.

According to an aspect of the disclosure, there is provided a method for animating a graphical object by an electronic device, the method including: receiving, by the electronic device, the graphical object having at least one predefined portion to animate; receiving, by the electronic device, an audio to obtain spectral frequencies of the audio; determining, by the electronic device, at least one of an intensity of the spectral frequencies and at least one range of the spectral frequencies; and generating, by the electronic device, at least one motion on the at least one predefined portion of the graphical object based on the at least one of the intensity of the spectral frequencies and the at least one range of the spectral frequencies.

The at least one motion may include at least one of a rotation motion, a linear motion, a breaking motion, a size expansion motion, a size shrinkage motion, a blurring motion, and a diving motion.

The generating the at least one motion may include: identifying, by the electronic device, the at least one motion to be performed on the at least one predefined portion of the graphical object based on a mapping between the at least one predefined portion of the graphical object and the at least one range of the spectral frequencies; and applying, by the electronic device, the identified at least one motion on the at least one predefined portion of the graphical object based on the intensity of the spectral frequencies.

The identifying the at least one motion to be performed on the at least one predefined portion of the graphical object may include: receiving, by the electronic device, a reference video; extracting, by the electronic device, at least one range of spectral frequencies of an audio in the reference video; determining, by the electronic device, at least one motion of at least one portion of at least one object in the reference video using a machine learning model, wherein the at least one portion of the at least one object in the reference video is similar to the at least one predefined portion of the graphical object; and correlating, by the electronic device, the at least one motion of the at least one portion of the at least one object in the reference video with the at least one range of the spectral frequencies of the audio in the reference video.

The identifying the at least one motion to be performed on the at least one predefined portion of the graphical object may include: receiving, by the electronic device, a reference audio; extracting, by the electronic device, at least one range of spectral frequencies of the reference audio; receiving, by the electronic device, a dataset of the at least one motion with a predefined rule; and correlating, by the electronic device, the at least one motion with the at least one range of the spectral frequencies of the reference audio based on the predefined rule.

According to an aspect of the disclosure, there is provided an electronic device for animating a graphical object, the electronic device including: a memory; a processor; and a graphical object motion controller coupled to the memory and the processor, the graphical object motion controller being configured to: receive the graphical object having at least one predefined portion to animate, receive an audio to obtain spectral frequencies of the audio, determine at least one of an intensity of the spectral frequencies and at least one range of the spectral frequencies, and generate at least one motion on the at least one predefined portion of the graphical object based on the at least one of the intensity of the spectral frequencies and the at least one range of the spectral frequencies.

The at least one motion may include at least one of a rotation motion, a linear motion, a breaking motion, a size expansion motion, a size shrinkage motion, a blurring motion, and a diving motion.

The graphical object motion controller may be further configured to generate the at least one motion by: identifying the at least one motion to be performed on the at least one predefined portion of the graphical object based on a mapping between the at least one predefined portion of the graphical object and the at least one range of the spectral frequencies; and applying the identified at least one motion on the at least one predefined portion of the graphical object based on the intensity of the spectral frequencies.

The graphical object motion controller may be further configured to identify the at least one motion to be performed on the at least one predefined portion of the graphical object by: receiving a reference video; extracting at least one range of spectral frequencies of an audio in the reference video; determining at least one motion of at least one portion of at least one object in the reference video using a machine learning model, wherein the at least one portion of the at least one object in the reference video is similar to the at least one predefined portion of the graphical object; and correlating the at least one motion of the at least one portion of the at least one object in the reference video with the at least one range of the spectral frequencies of the audio in the reference video.

The graphical object motion controller may be further configured to identify the at least one motion to be applied on the at least one predefined portion of the graphical object by: receiving a reference audio; extracting at least one range of spectral frequencies of the reference audio; receiving a dataset of the at least one motion with a predefined rule; and correlating the at least one motion with the at least one range of the spectral frequencies of the reference audio based on the predefined rule.

According to an aspect of the disclosure, there is provided a method of generating motion for an augmented reality (AR) object in an AR scene, including: identifying, by an electronic device, at least one AR object in the AR scene; receiving, by the electronic device, an audio; extracting, by the electronic device, sound spectrum features from the audio; identifying, by the electronic device, at least one joint in the at least one AR object, wherein the at least one joint is capable of causing relative motion of parts within the at least one AR object; and applying, by the electronic device, the sound spectrum features to the at least one joint, to cause relative motion of at least one part within the at least one AR object.

The sound spectrum features may include an intensity of spectral frequencies of the audio and at least one range of the spectral frequencies of the audio.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The present disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments can be practiced and to further enable those skilled in the art to practice the embodiments. Accordingly, the examples should not be construed as limiting the scope of the embodiments herein. Further, expressions such as "at least one of a, b, and c" should be understood as including only a, only b, only c, both a and b, both a and c, both b and c, all of a, b, and c, or other variations of thereof.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Some embodiments described herein provide a method for automatically animating a graphical object by an electronic device. The method includes receiving, by the electronic device, the graphical object with at least one predefined portion to animate. The method further includes receiving, by the electronic device, an audio to extract spectral frequencies of the audio. The method further includes determining, by the electronic device, at least one of an intensity of the spectral frequencies and at least one range of the spectral frequencies. The method further includes generating, by the electronic device, at least one motion on the at least one predefined portion of the graphical object based on the at least one of the intensity of the spectral frequencies and the at least one range of the spectral frequencies.

Other embodiments described herein provide an electronic device for automatically animating the graphical object. The electronic device includes a graphical object motion controller, a memory, a processor. The graphical object motion controller being coupled to the memory and the processor. The graphical object motion controller is configured for receiving the graphical object and an indication of at least one predefined portion to animate. The graphical object motion controller is further configured for obtaining spectral frequencies extracted from a received audio. The graphical object motion controller is further configured for determining at least one of an intensity of the spectral frequencies and at least one range of the spectral frequencies. The graphical object motion controller is further configured for generating at least one motion on the at least one predefined portion of the graphical object based on the at least one of the intensity of the spectral frequencies and the at least one range of the spectral frequencies.

Other embodiments described herein provide a method for generating motion for an Augmented Reality (AR) object in an AR scene. The method includes identifying, by an electronic device, one or more AR objects in the AR scene.

The method further includes receiving, by the electronic device, an audio. The method further includes extracting, by the electronic device, sound spectrum features from the audio. The method further includes identifying, by the electronic device, one or more joints in at least one AR object. The one or more joints being capable of causing relative motion of parts within the at least one AR object. The method further includes applying, by the electronic device, the sound spectrum features to at least one joint, to cause relative motion of at least one part within the at least one AR object.

Unlike existing methods and systems in the related art, the electronic device automatically animates the graphical object based on various sound spectral frequencies of sound in an audio playing in the background. The graphical object motion controller of the electronic device extracts spectral frequencies of a reference audio and identifies different ranges of the spectral frequencies. The different ranges of the spectral frequencies indicate the various sources of sound in the reference audio. Further, the graphical object motion controller intelligently assigns a predefined motion or a motion copied from a video to the graphical object for a particular range of the spectral frequencies. In response to playing another audio (e.g., speech, music, song, etc.), the graphical object motion controller applies the assigned motion on the graphical object according to an intensity and ranges of the spectral frequencies in the playing audio. Thus, movements of the graphical object are exactly suiting to a mood creating by the audio, which improves aesthetics of an animated graphical object and visual experience of a user.

An amplitude of sound generated by a violin and a drum may be same, but both the sound sources (e.g., violin and drum) produces the sound in different frequency ranges. The electronic device makes use of the variation of the frequency ranges of the sound sources to apply motion to the graphical object which differentiates the disclosed electronic device with respect to conventional methods.

Referring now to the drawings, and more particularly to FIGS. 1 through 9, there are shown example embodiments.

Figures 1, 2:
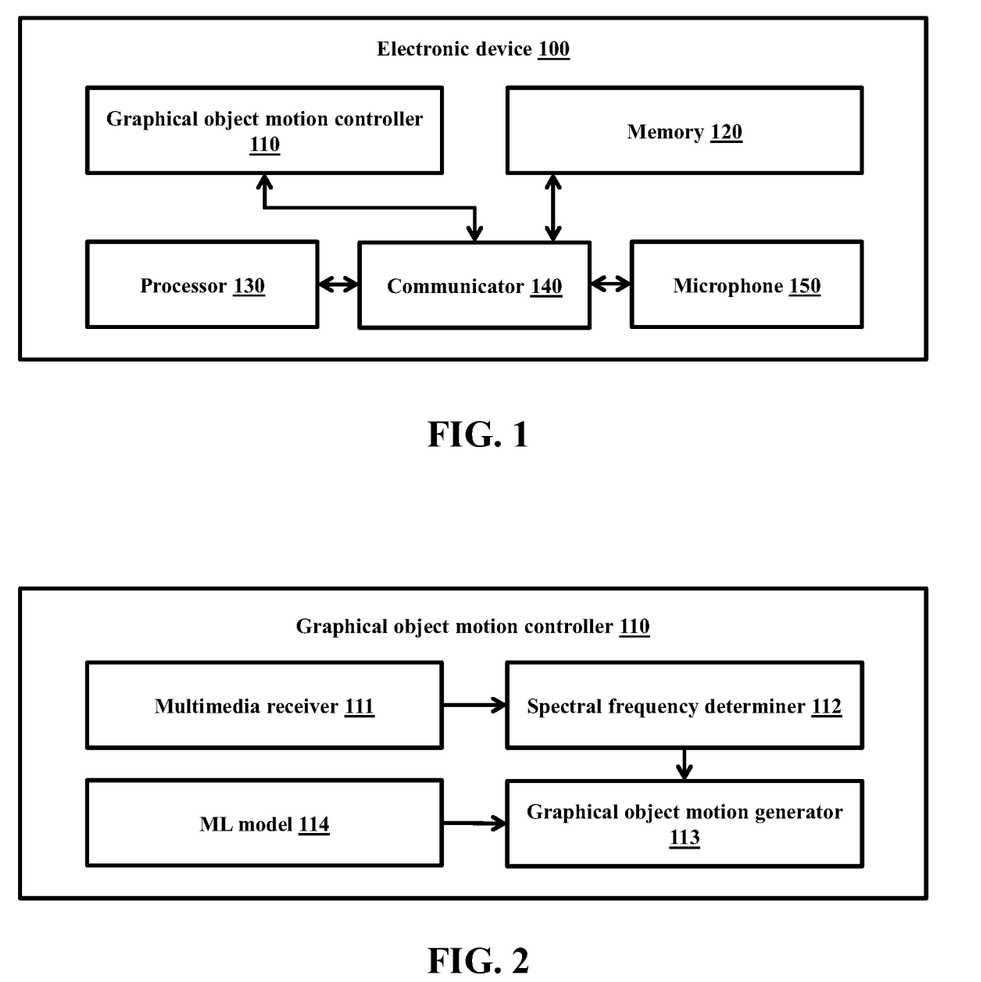
FIG. 1 is a block diagram of an electronic device for automatically animating a graphical object, according to an embodiment of the disclosure.
FIG. 2 is a block diagram of a graphical object motion controller for generating a motion on predefined portions of the graphical object, according to an embodiment of the disclosure.

FIG. 1 is a block diagram of an electronic device 100 for automatically animating a graphical object, according to an embodiment of the disclosure. Examples of the electronic device 100 include, but are not limited to, a smart phone, a tablet computer, a personal digital assistance (PDA), a desktop computer, an Internet of Things (IoT) device, a wearable device, etc. In some embodiments, the electronic device 100 includes a Graphical Object Motion Controller (GOMC) 110, a memory 120, a processor 130, a communicator 140 and a microphone 150. The GOMC controller 110 is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The GOMC 110 receives the graphical object with the predefined portions to animate from a memory 120 and/or an external source (e.g., internet). Examples of the graphical object are, but are not limited to, an AR object, a VR object, an emoji, a sticker, etc. Examples of the predefined portions are, but are not limited to, alphabets in a word, an appendage (e.g., leg, arm, hand, head) of an emoji of a person, a candle in a sticker of a birthday cake with candles, a lower portion (e.g., tail like portion) of alphabet "Y". The GOMC 110 receives an audio to extract spectral frequencies of the audio.

The spectral frequencies are unique features of a sound source, for example. In some embodiments, the microphone 150 captures the audio playing in a location where the electronic device 100 is located. Alternatively or additionally, the electronic device 100 creates the audio using a speaker. For example, the microphone 150 captures the audio and forwards the audio to the GOMC 110.

The GOMC 110 determines the intensity of the spectral frequencies and the ranges (e.g., frequency bands) of the spectral frequencies. The GOMC 110 determines the ranges of the spectral frequencies to identify a sound spectral feature. The sound spectral feature is a single value obtained by combining (e.g., summing, averaging, weighted averaging, etc.) one or more of spectral frequencies within a single frequency band or cross frequency bands. In some embodiments, the intensity of the spectral frequencies are determined by finding a Fast Fourier Transform (FFT) of the spectral frequencies of the audio. Power Spectral Density (PSD) of the spectral frequencies is an example of the intensity of the spectral frequencies. For example, sound spectral features are extracted from the frequency bands corresponding to human voice, sub-bass sound, bass sound, lower midrange sound, midrange sound, higher midrange sound, presence sound, brilliance sound, and background/surrounding noise sound.

The spectral frequencies in a range of 125 hertz (Hz) to 8 Kilo Hertz (kHz) indicate the human voice in the audio. The spectral frequencies in a range of 16 Hz to 60 Hz indicate the sub-bass sound in the audio. The sub-bass sound is a low musical range containing an upright bass, a tuba, a bass guitar. The spectral frequencies in a range of 60 Hz to 250 Hz indicate the bass sound in the audio. The spectral frequencies in a range of 250 Hz to 500 Hz indicate the lower midrange sound in the audio such as typical brass instruments, and mid woodwinds, like an alto saxophone and a middle range of a clarinet.

The spectral frequencies in a range of 500 Hz to 2 kHz indicate the midrange sound in the audio. Higher end of fundamental frequencies created by most musical instruments such as violin and piccolo are included under the midrange sound. The spectral frequencies in a range of 2 kHz to 4 kHz indicate the higher midrange sound in the audio. Many instruments generate harmonics at multiples of the fundamental frequency. The harmonic of 2 times, 3 times, and 4 times of the fundamental frequency of many instruments comes under the higher midrange sound. The spectral frequencies in a range of 4 kHz to 6 kHz indicate the presence of sound in the audio.

Harmonics for the violin and the piccolo are found in 4 to 6 kHz range of the spectral frequencies. The spectral frequencies in a range of 6 kHz to 20 kHz indicate the brilliance of the sound in the audio. Above 6 kHz, sounds become more like whines and whistles because a progression of the sound is so high pitched. Sibilant sounds (e.g., unwanted whistle when sometimes pronouncing an 's') and harmonics for certain percussive sounds like cymbals are found in the 6 kHz to 20 kHz range of the spectral frequencies. The spectral frequencies in a range of 16 kHz to 20 kHz indicate the background/surrounding noise sound in the audio. Additional sounds in the audio can be extracted by dividing entire spectral frequencies into smaller bands and combining the PSD of the spectral bands to generate custom audio features.

The GOMC 110 generates a motion on the predefined portions of the graphical object based on the intensity of the spectral frequencies and the ranges of the spectral frequencies. In some embodiments, the motion includes a rotation motion, a linear motion, a breaking motion, a size expansion motion, a size shrinkage motion, a blurring motion, and a diving motion. In some embodiments, the GOMC 110 generates the linear motion along an x-axis direction, a y-axis direction, and/or a z-axis direction based on the intensity of the spectral frequencies and the ranges of the spectral frequencies applied independently or together on X, Y Z coordinates of the predefined portions of the graphical object, respectively. In other embodiments, the GOMC 110 generates the rotational motion along the x-axis direction, the y-axis direction, and/or the z-axis direction based on the intensity of the spectral frequencies and the ranges of the spectral frequencies applied independently or together on the predefined portions of the graphical object to generate a pitch motion, a roll motion, and/or a yaw motion, respectively.

In some embodiments, the GOMC 110 generates the size expansion or size shrinking motion along the x-axis direction, the y-axis direction, and/or the z-axis direction based on the intensity of the spectral frequencies and the ranges of the spectral frequencies applied independently or together overall on the graphical object. In other embodiments, the GOMC 110 generates the diving motion on the predefined portions of the graphical object for generating granular micromotions on the predefined portions of the graphical object, in terms of the linear, rotational, or resizing motions. In some embodiments, the GOMC 110 generates the breaking motion by identifying portions of the graphical object to apply a break and/or a dissolving effect on the graphical object based on the intensity of the spectral frequencies and the ranges of the spectral frequencies.

In some embodiments, the GOMC 110 identifies the motion to be performed on the predefined portions of the graphical object based on a mapping between the predefined portions of the graphical object and the ranges of the spectral frequencies. Alternatively or additionally, the GOMC 110 applies the identified motion on the predefined portions of the graphical object based on the intensity of the spectral frequencies.

In some embodiments, the GOMC 110 receives a reference video and extracts the ranges of spectral frequencies of an audio in the reference video. In other embodiments, the reference video is received from the memory 120 and/or an external device. Alternatively or additionally, the GOMC 110 determines a motion of portions of one or more objects in the reference video using a ML model 114. In some embodiments, the GOMC 110 uses a predefined rule or trained data to identify the portions of the one or more objects in the reference video, where the portions of the one or more objects in the reference video are similar to the predefined portions of the graphical object. The GOMC 110 correlates the motion of the portions of the one or more objects in the reference video with the ranges of the spectral frequencies of the audio in the reference video.

In an example, consider the reference video of a dancing boy. The dancing boy moves his hands upwards while playing a sound of drum in the video. In such an example, the GOMC 110 correlates the ranges of spectral frequencies of the sound of drum with the upward motion of the hands. Alternatively or additionally, the dancing boy moves his legs upwards while playing a sound of violin in the video. As such, the GOMC 110 correlates the ranges of spectral frequencies of the sound of violin with the upwards motion of the legs. Further, the GOMC 110 receives an emoji of a monkey to animate based on a new song. Consequently, the GOMC 110 identifies that the hands of the monkey and the hands of the boy are similar. Alternatively or additionally, the GOMC 110 identifies that the legs of the monkey and the legs of the boy are similar. In another example, the GOMC 110 receives a new song containing sounds of the drum and the violin. In such an example, the GOMC 110 applies the upwards motion to the legs of the monkey whenever the sound of the violin reaches the GOMC 110. An intensity of the upwards motion of the legs of the monkey varies based on the intensity of the sound of the violin in the new song. Alternatively or additionally, the GOMC 110 applies the upwards motion to the hands of the monkey whenever the sound of the drum reaches the GOMC 110. An intensity of the upwards motion of the hands of the monkey varies based on the intensity of the sound of the violin in the new song. In some embodiments, the GOMC 110 applies the upwards motion to the hands and the legs of the monkey whenever the sound of the violin and the drum together reaches the GOMC 110. The intensity of the upwards motion of the hands and the legs of the monkey varies based on the intensity of the sound of the violin and the drum in the new song.

In other embodiments, the GOMC 110 receives a reference audio and extracts ranges of spectral frequencies of the reference audio. Alternatively or additionally, the GOMC 110 receives a dataset of the motion with a predefined rule. As such, the GOMC 110 correlates the motion with the ranges of the spectral frequencies of the reference audio based on the predefined rule.

In an example, the GOMC 110 extracts the bass sound and the midrange sound from the reference audio. Further, the GOMC 110 receives the dataset of the motion with the predefined rule. The dataset of the motion includes the linear motion and the rotation motion, where the predefined rule is to apply the linear motion to a first predefined portion of the graphical object for the bass sound, and to apply the rotation motion to a second predefined portion of the graphical object for the midrange sound. For example, the first predefined portion may be a largest predefined portion of the graphical object. Alternatively or additionally, the second portion may be a smallest predefined portion of the graphical object.

In another example, the GOMC 110 receives a sticker of a helicopter to animate based on a new song. In such an example, the GOMC 110 identifies a propeller of the helicopter as the smallest predefined portion, and a remaining body of the helicopter as the largest predefined portion. Further, the GOMC 110 receives the new song containing the bass sound and the midrange sound. As such, the GOMC 110 applies the linear motion to the remaining body whenever the bass sound in the new song reaches the GOMC 110. An intensity of the linear motion of the remaining body varies based on the intensity of the bass sound in the new song. Alternatively or additionally, the GOMC 110 applies the rotation motion to the propeller whenever the midrange sound of the new song reaches the GOMC 110. An intensity of the rotation motion of the propeller varies based on the intensity of the midrange sound in the new song. In some embodiments, the GOMC 110 applies the linear motion to the remaining body and the rotation motion to the propeller whenever the sound of the bass sound and the midrange sound together reaches the GOMC 110. The intensity of the linear and rotation motions varies based on the intensity of the sound of the bass sounds and the midrange sound in the new song.

In other embodiments, the GOMC 110 identifies an AR object in an AR scene. Further, the GOMC 110 receives the audio. Further, the GOMC 110 extracts sound spectrum features from the audio. In some embodiments, the sound spectrum features includes the intensity of spectral frequencies of the audio and the ranges of the spectral frequencies of the audio. Further, the GOMC 110 identifies one or more joints in the AR object, where the one or more joints are capable of causing relative motion of parts within the AR object. That is, a joint identifies a position in the AR object where ends of one or more parts (e.g., predefined portions) of the AR object intersect. Alternatively or additionally, the GOMC 110 applies the sound spectrum features to the identified joints, to cause relative motion of the parts within the AR object.

The memory 120 stores the dataset of the motion with the predefined rule, the graphical object with predefined portions, the reference video, the reference audio, the audio, an information on a list and number of the sound spectral features. The memory 120 stores instructions to be executed by the processor 130. The memory 120 may include volatile storage elements and/or non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than its storage space. In certain examples, a non-transitory storage medium may store data that can, over time, change (e.g., in Random Access Memory (RAM) or cache). The memory 120 can be an internal storage unit or it can be an external storage unit of the electronic device 100, a cloud storage, or any other type of external storage.

The processor 130 is configured to execute instructions stored in the memory 120. The processor 130 may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor 130 may include multiple cores to execute the instructions. The communicator 140 is configured for communicating internally between hardware components in the electronic device 100. Alternatively or additionally, the communicator 140 is configured to facilitate the communication between the electronic device 100 and other devices via one or more networks (e.g., radio technology). The communicator 140 includes an electronic circuit specific to a standard that enables wired and/or wireless communication.

Although FIG. 1 shows the hardware components of the electronic device 100, it is to be understood that other embodiments are not limited thereon. In other embodiments, the electronic device 100 may include a smaller or a greater number of components. Further, the labels or names of the components are used only for illustrative purposes and do not limit the scope of the disclosure. For example, one or more components can be combined together to perform same or substantially similar functions for automatically animating the graphical object.

FIG. 2 is a block diagram of the GOMC 110 for generating the motion on the predefined portions of the graphical object, according to an embodiment of the disclosure. In some embodiments, the GOMC 110 includes a multimedia receiver 111, a spectral frequency determiner 112, a graphical object motion generator 113, and a ML model 114. The multimedia receiver 111, the spectral frequency determiner 112, the graphical object motion generator 113, and the ML model 114 are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The multimedia receiver 111 receives the graphical object with the predefined portions to animate. The multimedia receiver 111 receives an audio to extract spectral frequencies of the audio. The spectral frequency determiner 112 determines the intensity of the spectral frequencies and the ranges of the spectral frequencies. The graphical object motion generator 113 generates the motion on the predefined portions of the graphical object based on the intensity of the spectral frequencies and the ranges of the spectral frequencies. In some embodiments, the graphical object motion generator 113 identifies the motion to be performed on the predefined portions of the graphical object based on the mapping between the predefined portions of the graphical object and the ranges of the spectral frequencies. Alternatively or additionally, the graphical object motion generator 113 applies the identified motion on the predefined portions of the graphical object based on the intensity of the spectral frequencies.

In some embodiments, the multimedia receiver 111 receives the reference video. Alternatively or additionally, the spectral frequency determiner 112 extracts the ranges of spectral frequencies of the audio in the reference video. In other embodiments, the graphical object motion generator 113 determines the motion of portions of one or more objects in the reference video using the ML model 114. In other embodiments, the graphical object motion generator 113 uses the predefined rule or the trained data to identify the portions of the one or more objects in the reference video, where the portions of the one or more objects in the reference video is similar to the predefined portions of the graphical object. The graphical object motion generator 113 correlates the motion of the portions of the one or more objects in the reference video with the ranges of the spectral frequencies of the audio in the reference video.

In other embodiments, the multimedia receiver 111 receives the reference audio. Alternatively or additionally, the spectral frequency determiner 112 extracts the ranges of the spectral frequencies of the reference audio. For example, the graphical object motion generator 113 receives the dataset of the motion with the predefined rule. Alternatively or additionally, the graphical object motion generator 113 correlates the motion with the ranges of the spectral frequencies of the reference audio based on the predefined rule.

At least one of the plurality of modules may be implemented through the ML model 114. A function associated with the ML model 114 may be performed through the non-volatile memory 120, the volatile memory 120, and the processor 130.

The one processor or a plurality of processors 130 control the processing of the input data in accordance with a predefined operating rule or ML model 114 stored in the non-volatile memory 120 and the volatile memory 120. The predefined operating rule or artificial intelligence model is provided through training or learning.

In some embodiments, being provided through learning may refer to applying a learning technique to a plurality of learning data, a predefined operating rule, or an ML model 114 of a desired characteristic. The learning may be performed in a device itself in which the ML model 114 (e.g., processor 130) is performed, and/or may be implemented through a separate server/system.

The ML model 114 may consist of a plurality of neural network layers. Each layer has a plurality of weight values, and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The learning technique is a method for training a predetermined target device (e.g., a robot) using a plurality of learning data to cause, allow, or control the target device to make a determination or prediction. Examples of learning techniques include, but are not limited to, supervised learning, unsupervised learning, semi-supervised learning, or reinforcement learning.

Although the FIG. 2 shows the hardware components of the GOMC 110, it is to be understood that other embodiments are not limited thereon. In other embodiments, the GOMC 110 may include a smaller or a greater number of components. Further, the labels or names of the components are used only for illustrative purposes and do not limit the scope of the disclosure. For example, one or more components can be combined together to perform same or substantially similar functions for generating the motion on the predefined portions of the graphical object.

Figure 3:
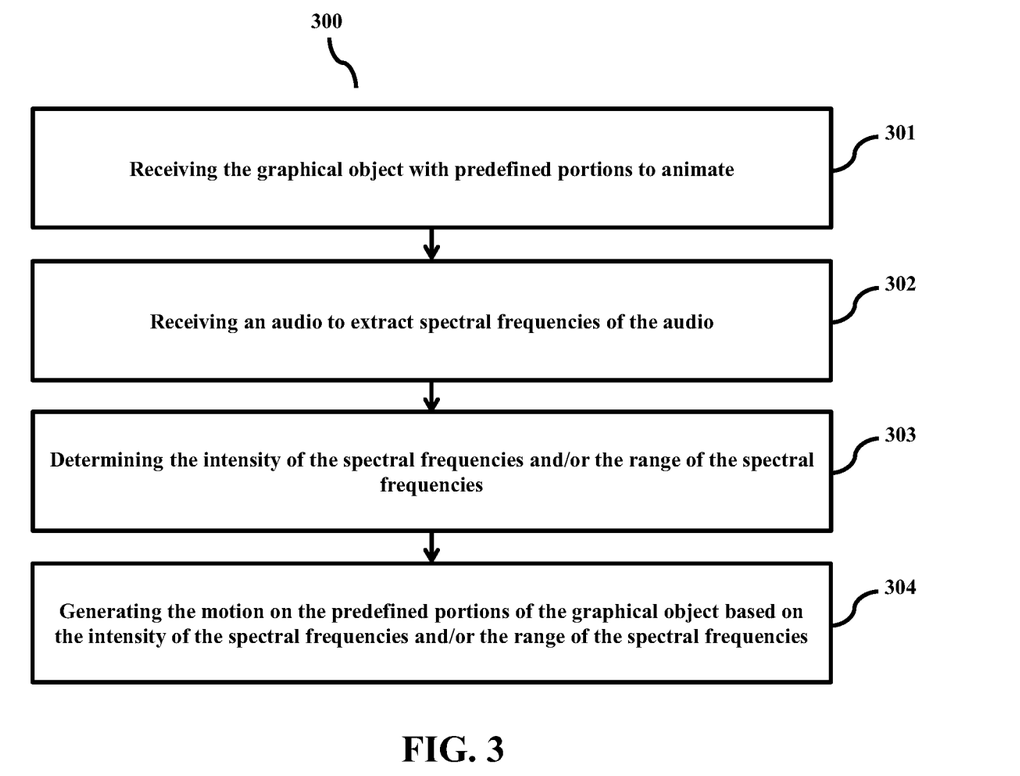
FIG. 3 is a flow diagram illustrating a method for automatically animating the graphical object using the electronic device, according to an embodiment of the disclosure.

FIG. 3 is a flow diagram 300 illustrating a method for automatically animating the graphical object using the electronic device 100, according to an embodiment of the disclosure. In some embodiments, the method allows the GOMC 110 to perform steps 301-304 of the flow diagram 300. At step 301, the method includes receiving the graphical object with the predefined portions to animate. At step 302, the method includes receiving the audio to extract the spectral frequencies of the audio. At step 303, the method includes determining the intensity of the spectral frequencies and/or the ranges of the spectral frequencies. At step 304, the method includes generating the motion on the predefined portions of the graphical object based on the intensity of the spectral frequencies and/or the ranges of the spectral frequencies.

Figure 4:
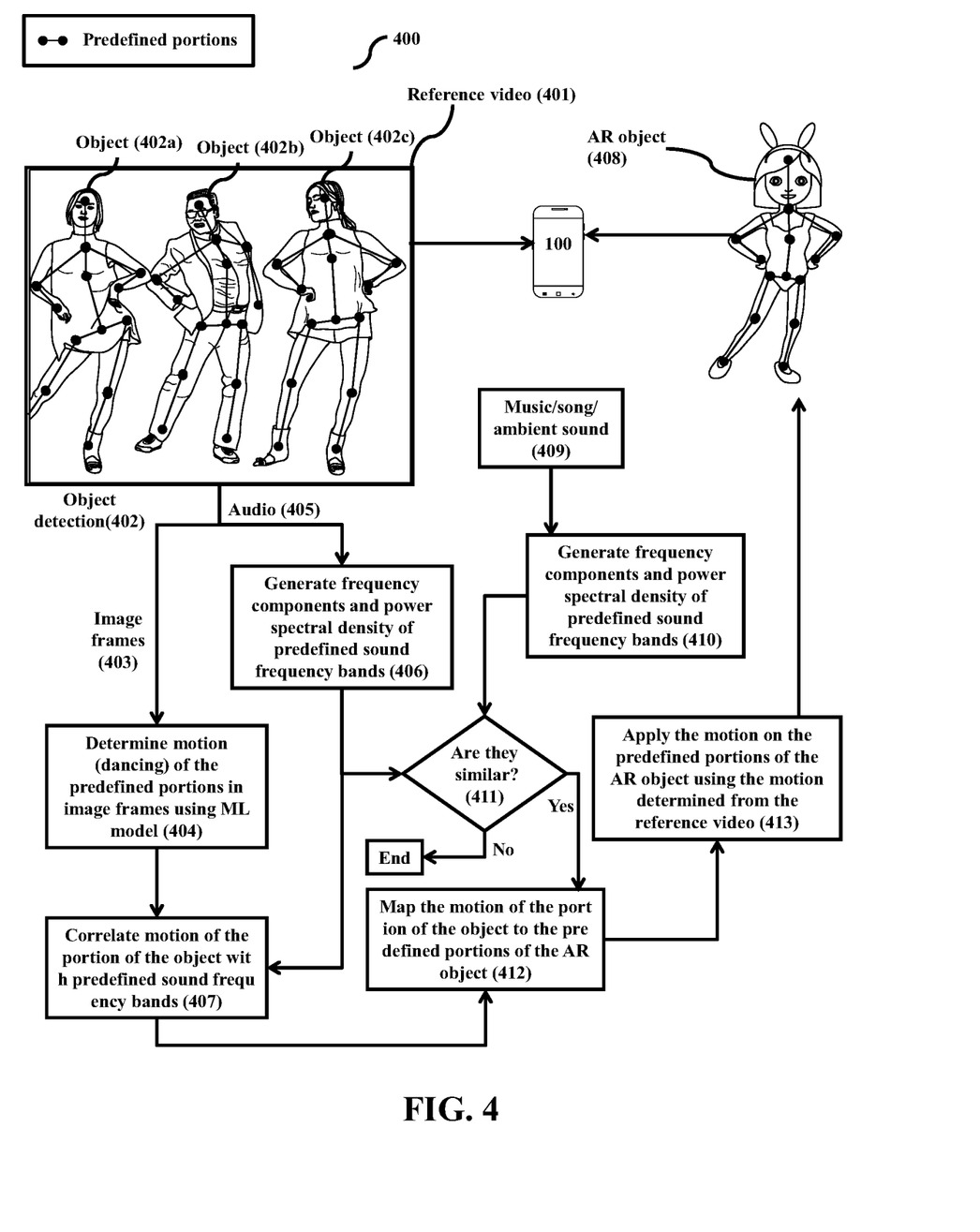
FIG. 4 is a flow diagram illustrating a method for applying a motion from a reference video on the graphical object by the electronic device, according to an embodiment of the disclosure.

FIG. 4 is a flow diagram 400 illustrating a method of applying the motion from the reference video on the graphical object by the electronic device 100, according to an embodiment of the disclosure. The flow diagram 400 includes steps 401-413. At step 401, the electronic device 100 receives the reference video. At step 402, the electronic device 100 detects the objects, such as a dancing boy (e.g., object 402b) and two dancing girls (e.g., objects 402a and 402c), present in the reference video. Alternatively or additionally, the electronic device 100 determines the predefined portions of each object 402a-402c using the ML model 114. At step 403, the electronic device 100 analyzes the movement of the predefined portions of each object 402a-402c in each image frame of the reference video. At step 404, the electronic device 100 determines the motion (e.g., dancing steps) of the predefined portions of the object 402a-402c using multi-human pose estimation methods. At step 405, the electronic device 100 extracts the audio from the reference video. At step 406, the electronic device 100 generates the spectral frequency components (e.g., spectral frequencies) and the PSD of the predefined sound frequency bands (e.g., range of the spectral frequencies) from the extracted audio. At step 407, the electronic device 100 correlates the determined motion of the object 402a-402c with the predefined sound frequency bands.

At step 408, the electronic device 100 receives an AR object with the predefined portions to animate based on the audio. At step 409, the electronic device 100 receives the audio (e.g., music, ambient sound, song) to animate the AR object. At step 410, the electronic device 100 generates the frequency components and the PSD of the predefined sound frequency bands from the received audio. At step 411, the electronic device 100 checks whether the spectral frequency components and the PSDs generated from the extracted audio and the received audio are the same and/or similar. At step 412, the electronic device 100 maps the motion of the portion of the object 402a-402c to the predefined portion of the AR object, where the portion of the object 402a-402c and the predefined portion of the AR object are similar. For example, the electronic device 100 maps the motion of hands portion of the AR object to the hands portion of the object 402a-402c. At step 413, the electronic device 100 applies the mapped motion on the predefined portions of the AR object for animating the AR object.

Figure 5:
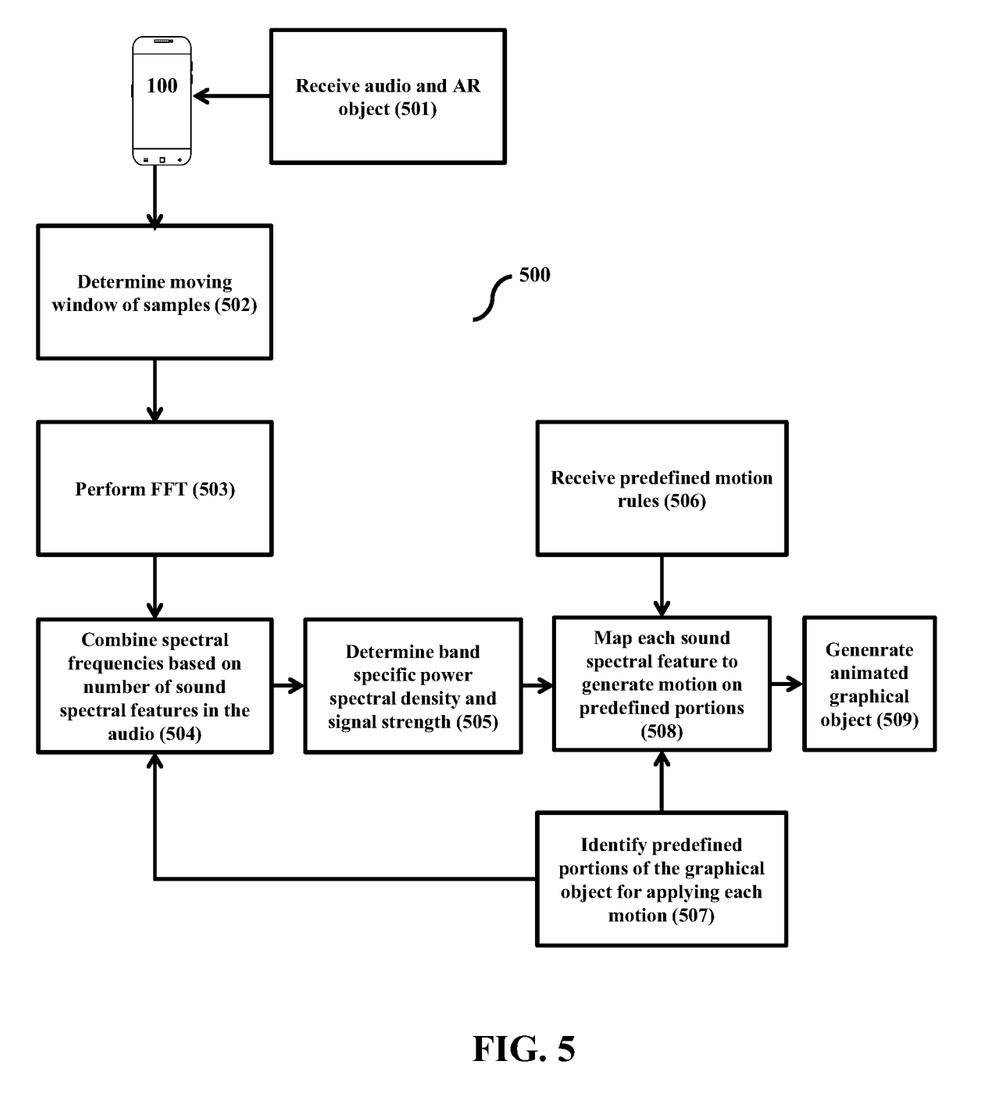
FIG. 5 is a flow diagram illustrating a method for applying a predefined motion on the graphical object based on a predefined rule by the electronic device, according to an embodiment of the disclosure.

FIG. 5 is a flow diagram 500 illustrating a method of applying the predefined motion on the graphical object based on the predefined rule by the electronic device 100, according to an embodiment of the disclosure. The flow diagram 500 includes steps 501-509. At step 501, the electronic device 100 receives the AR object and the audio to animate the AR object. At step 502, the electronic device 100 determines a moving window of audio samples from the audio. At step 503, the electronic device 100 performs FFT on the audio samples to generate the frequency domain representation of the audio. At step 504, the electronic device 100 combines the spectral frequencies of the audio obtained from the frequency domain representation of the audio based on a number of sound spectral features present in the audio. At step 505, the electronic device 100 determines the band specific PSD and the signal strength from the frequency domain representation of the audio. At step 506, the electronic device 100 receives the motion with the predefined rules from the dataset. The predefined rules includes a condition of mapping the spectral feature to the sounds type, and the type of motion to apply on the joint. At step 507, the electronic device 100 identifies the predefined portions of the AR object for applying each motion. At step 508, the electronic device 100 maps each sound spectral feature for generating the motion on the predefined portions based on the predefined rules. At step 509, the electronic device 100 generates the animated AR object by applying the motion on the predefined portions of the AR object. The predefined rules includes a condition of mapping the spectral feature to the sounds type, and the type of motion to apply on the joint.

Figure 6:
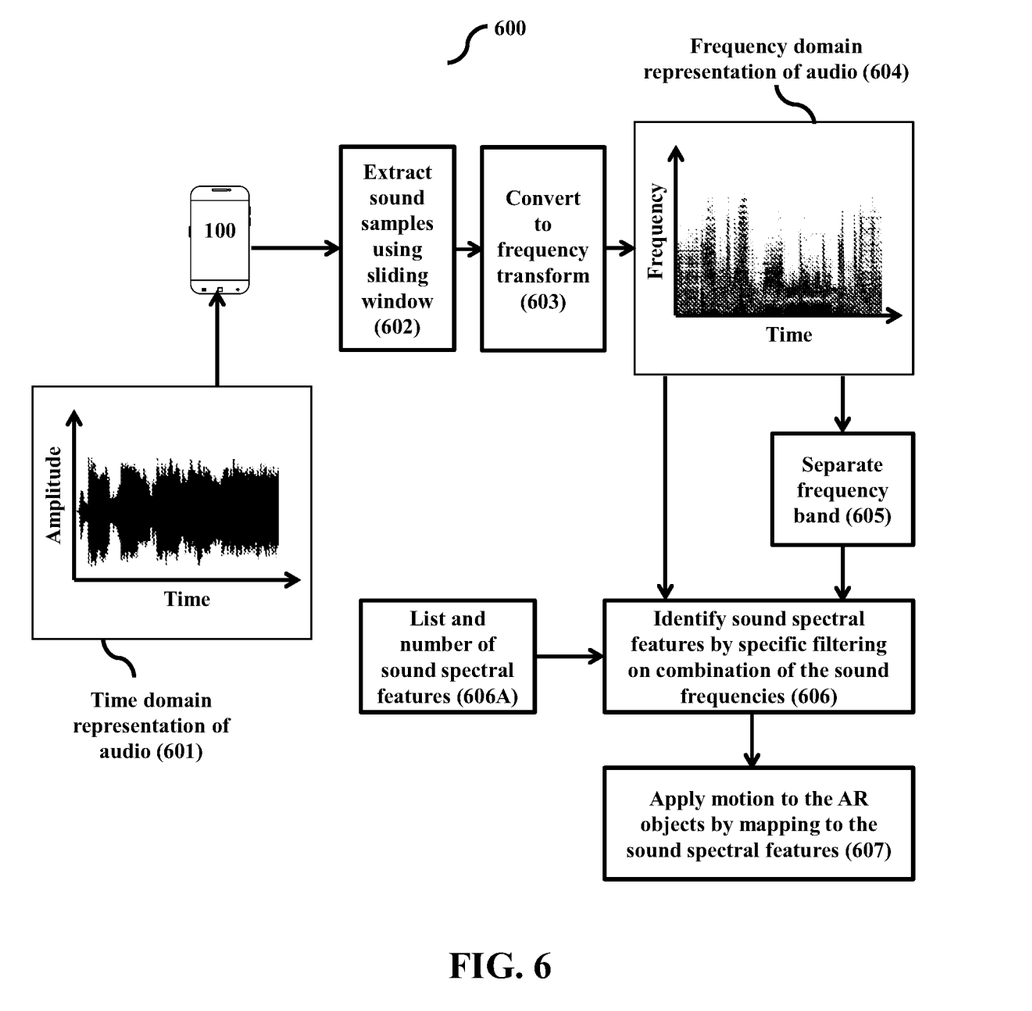
FIG. 6 is a flow diagram illustrating a method of determining an intensity of spectral frequencies and ranges of the spectral frequencies of an audio by the electronic device, according to an embodiment of the disclosure.

FIG. 6 is a flow diagram 600 illustrating a method of determining the intensity of the spectral frequencies and the ranges of the spectral frequencies of the audio by the electronic device 100, according to an embodiment of the disclosure. The flow diagram 600 includes steps 601-607. At step 601, the electronic device 100 receives the audio that is represented in time domain and the AR object. At step 602, the electronic device 100 extracts sound samples from the audio using a sliding window method. At step 603, the electronic device 100 performs frequency transformation on the sound samples using the FFT. At step 604, the electronic device 100 generates the frequency domain representation of the audio in response to performing the frequency transformation. At step 605, the electronic device 100 identifies and separates the different frequency bands from the frequency domain representation of the audio. At step 606, the electronic device 100 identifies the sound spectral features in the audio by performing specific filtering on combination of the sound frequencies and the list and number of sound spectral features 606A defined at the memory 120. At step 607, the electronic device 100 applies the motion to the AR object by mapping to the sound spectral features.

The various actions, acts, blocks, steps, or the like in the flow diagrams (e.g., 300-600) may be performed in the order presented, in a different order, and/or simultaneously. Further, in some embodiments, some of the actions, acts, blocks, steps, or the like may be omitted, added, modified, skipped, or the like without departing from the scope of the disclosure.

The received audio can be broken down into different sound spectral features such as the human voice, the bass sound, medium sound, treble sound, and the background/surrounding noise. A fixed number of sound spectral features can be generated from different sound sampling rate. As such, a number of sound samples available per second does not affect the motion generated. That is, a same number of spectral/frequency components can be generated from a varying number of time domain samples. The frequency components generated are similar, for the same audio, from different sources with different bit rates and/or audio quality. If the frequency components are similar, then the sound spectral features extracted for the received audio are also similar. The time domain samples can look completely different for the audio received from different sources with different bit rates and/or audio quality.

Figure 7:
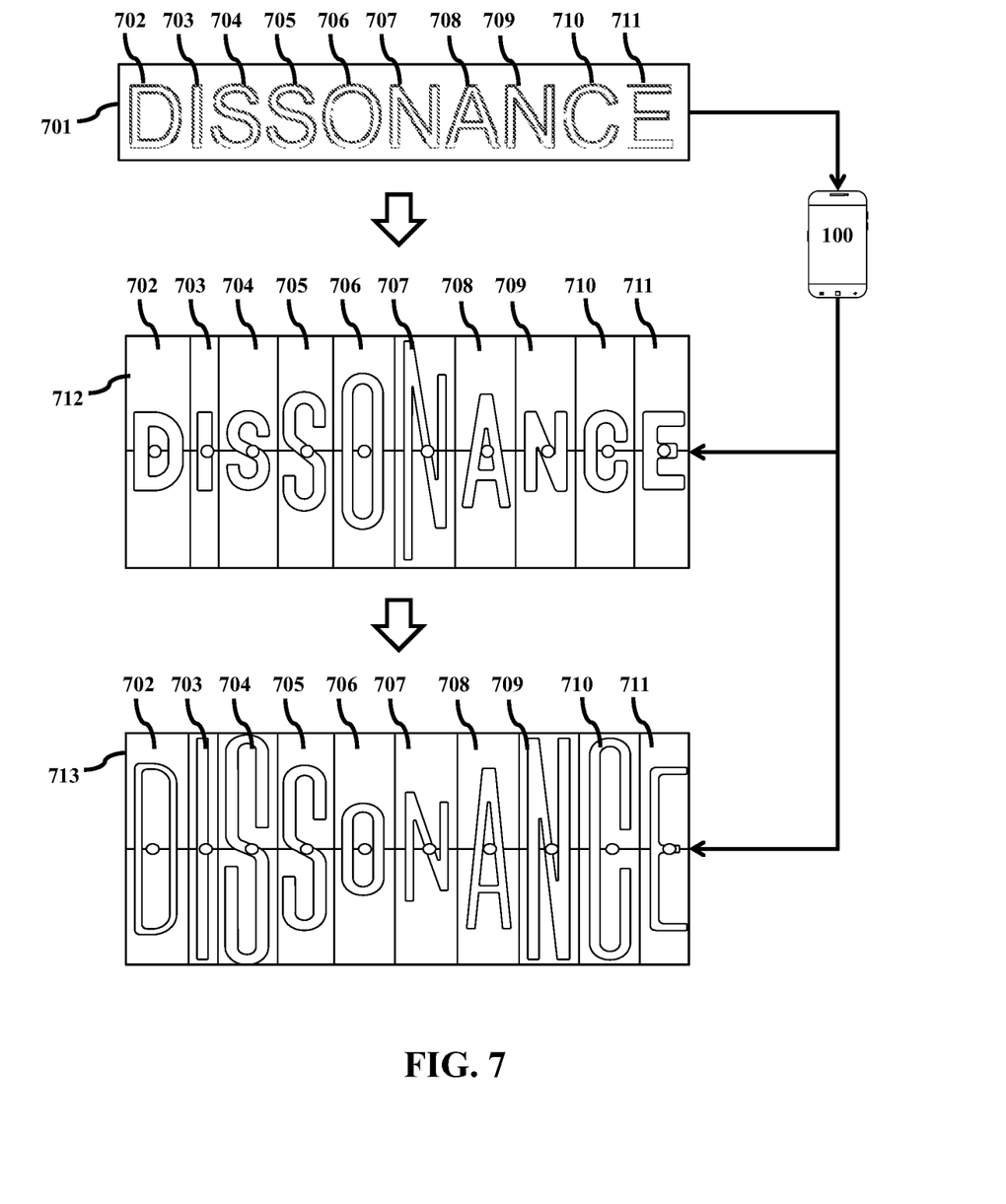
FIG. 7 illustrates an example scenario of generating a size expansion motion, a size shrinkage motion, and a linear motion on alphabets in a text based on the intensity of the spectral frequencies and the ranges of the spectral frequencies of the audio, according to an embodiment of the disclosure.

FIG. 7 illustrates an example scenario of generating the size expansion motion, the size shrinkage motion, and the linear motion on alphabets in a text based on the intensity of the spectral frequencies and the ranges of the spectral frequencies of the audio, according to an embodiment of the disclosure. As shown in FIG. 7, the electronic device 100 receives a text 701 (e.g., 'DISSONANCE') to animate. The electronic device 100 identifies each alphabet (or character) (e.g., 702-711) in the text 701 as the predefined portions of the text 701. That is, the electronic device 100 detects that 10 predefined portions are present in the text 701 and fetches 10 sound spectral features from the memory 120. Alternatively or additionally, the electronic device 100 checks for the motion assigned to each sound spectral feature and correlates that motion with each predefined portion (e.g., alphabet 702-711). The assigned motion can be the size expansion motion, the size shrinkage motion, the linear motion, and different combinations of the size expansion motion, the size shrinkage motion, the linear motion, or the like. In response to receiving a music containing the 10 sound spectral features, the electronic device 100 generates the motion on the alphabets 702-711, as shown in 712 and 713, based on the intensity of the sound spectral feature, the motion to which the alphabet 702-711 is linked, and an instant at which the sound spectral feature is playing in the music.

Figure 8:
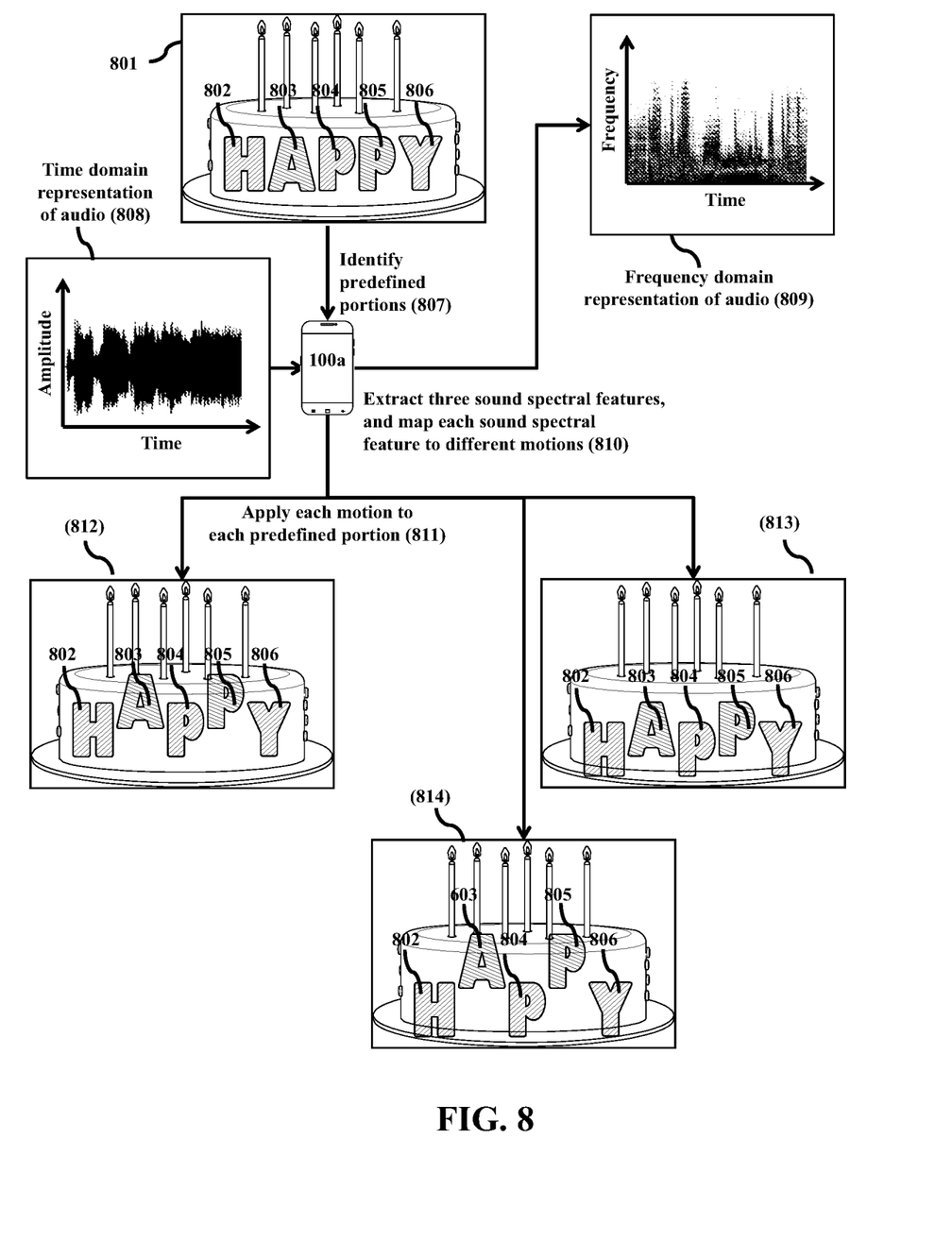
FIG. 8 illustrates an example scenario of generating a linear motion on the alphabets in the text based on the intensity of the spectral frequencies and the ranges of the spectral frequencies of the audio, according to an embodiment of the disclosure.

FIG. 8 illustrates an example scenario of generating the linear motion on the alphabets in the text based on the intensity of the spectral frequencies and the ranges of the spectral frequencies of the audio, according to an embodiment of the disclosure. At step 801, the electronic device 100 receives a sticker of a cake that contains a text 'HAPPY' to animate, for example. At step 807, the electronic device 100 identifies each alphabet 802-806 in the text as the predefined portions of the text. At step 808, the electronic device 100 receives the audio represented in a time domain. At step 809, the electronic device 100 converts the representation of the audio in the time domain to a frequency domain. At step 810, the electronic device 100 extracts three sound spectral features from the frequency domain representation of the audio by averaging the PSD of the range of frequencies. Alternatively or additionally, the electronic device 100 maps each sound spectral feature to different motions.

For example, the electronic device 100 maps the first sound spectral feature (e.g., a bass sound) to the motion of changing a position of a first set of predefined portions along a positive Y-axis direction, the second sound spectral feature (e.g., a human voice) to the motion of changing a position of a second set of predefined portions along a negative Y-axis direction, and the third sound spectral feature (e.g., a background noise sound) to the motion of changing a position of the first set of predefined portions along the positive Y-axis direction and the second set of predefined portions along the negative Y-axis direction together. At step 811, the electronic device 100 applies the mapped motion of the first sound spectral feature on the first set of predefined portions (e.g., alphabets A 803 and P 805). Alternatively or additionally, the electronic device 100 applies the mapped motion mapped of the second sound spectral feature on the second set of predefined portions (e.g., alphabets H 802, P 804, and Y 806). Alternatively or additionally, the electronic device 100 applies the mapped motion of the third sound spectral feature on the first set of predefined portions and the second set of predefined portions. At step 812, the electronic device 100 detects the first sound spectral feature from the audio and generates the motion of changing the position of the alphabets A 803 and P 805 along the positive Y-axis direction. An amount the generated motion depends on the PSD of the spectral frequencies corresponding to the first sound spectral feature present in the audio.

At step 813, the electronic device 100 detects the second sound spectral feature from the audio and generates the motion of changing the position of the alphabets H 802, P 804, and Y 806 along the negative Y-axis direction. An amount of the generated motion depends on the PSD of the spectral frequencies corresponding to the second sound spectral feature present in the audio. At step 814, the electronic device 100 detects the third sound spectral feature from the audio and together generates the motions of changing the position of the alphabets H 802, P 804, and Y 806 along the negative Y-axis direction and the changing the position of the alphabets A 803 and P 805 along the positive Y-axis direction. An amount of the generated motion depends on the PSD of the spectral frequencies corresponding to the third sound spectral feature present in the audio.

Figure 9:
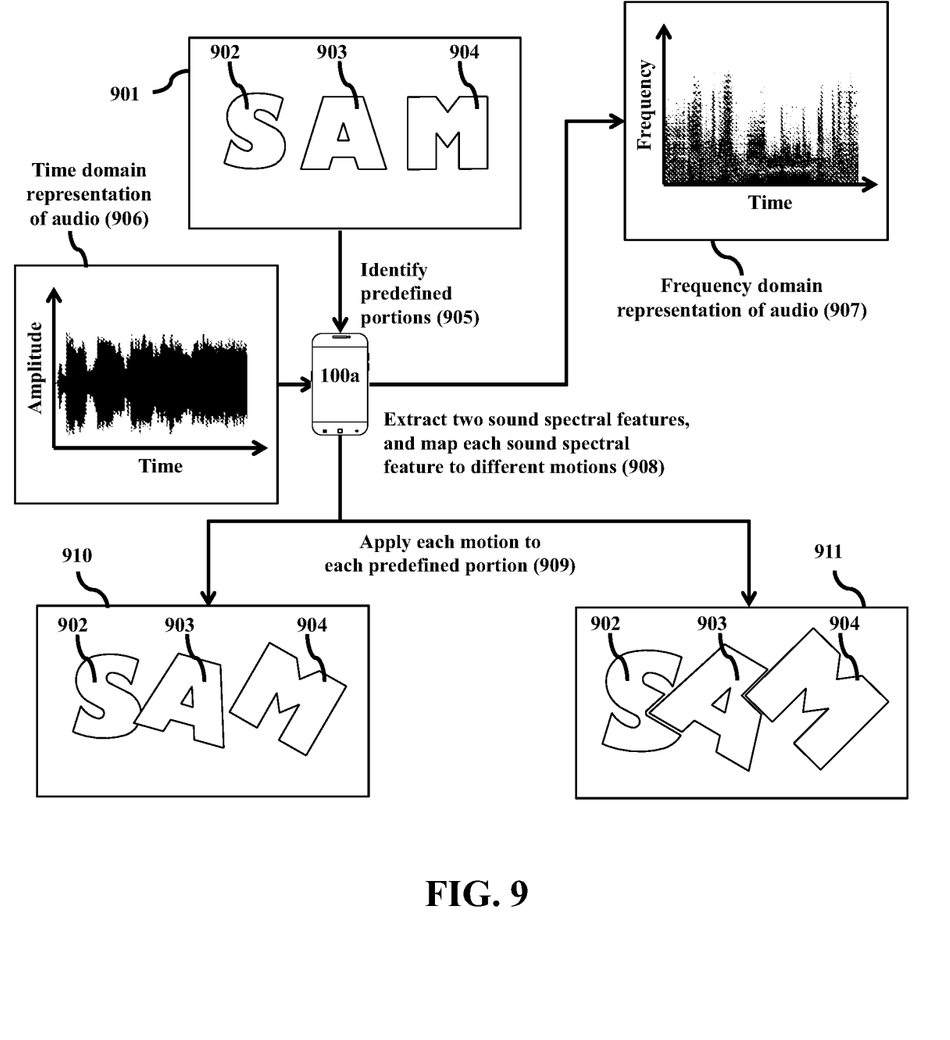
FIG. 9 illustrates an example scenario of generating a rotation motion and the size expansion motion on the alphabets in the text based on the intensity of the spectral frequencies and the ranges of the spectral frequencies of the audio, according to an embodiment of the disclosure.

FIG. 9 illustrates an example scenario of generating the rotation motion and the size expansion motion on the alphabets in the text based on the intensity of the spectral frequencies and the ranges of the spectral frequencies of the audio, according to embodiments of the disclosure. At step 901, the electronic device 100 receives a text 'SAM' to animate, for example. At step 905, the electronic device 100 identifies each alphabet 902-904 in the text as the predefined portions of the text. At step 906, the electronic device 100 receives the audio represented in a time domain. At step 907, the electronic device 100 converts the representation of the audio in the time domain to a frequency domain. At step 908, the electronic device 100 extracts the two sound spectral features from the frequency domain representation of the audio by averaging the PSD of the range of frequencies. Alternatively or additionally, the electronic device 100 maps each sound spectral feature to different motions.

For example, the electronic device 100 maps the first sound spectral feature (e.g., a bass sound) to the motion of changing a width and a height of the first set of predefined portions. The electronic device 100 maps the second sound spectral feature (e.g., a human voice) to the motion of clockwise rotation around the Z-axis direction and changing the width and the height of the second set of predefined portions. At step 909, the electronic device 100 applies the mapped motion of the first sound spectral feature on the first set of predefined portions (e.g., alphabet S 902). Alternatively or additionally, the electronic device 100 applies the mapped motion of the second sound spectral feature on the second set of predefined portions (e.g., alphabets A 903, M 904). At step 910 and 911, the electronic device 100 detects the first sound spectral feature and the second sound spectral feature from the audio and generates the motion of changing the width and height of the alphabet S 902, changing the width and the height of the alphabets A 903 and M 904, and performing the rotation motion of the alphabets A 903 and M 904. An amount of the generated motion depends on the PSD of the spectral frequencies corresponding to the sound spectral features present in the audio.

The foregoing description of the specific embodiments may reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the scope of the embodiments as described herein.

What is claimed is:

1. A method for animating a graphical object by an electronic device, the method comprising:
   receiving, by the electronic device, the graphical object having at least one predefined portion to animate;
   receiving, by the electronic device, an audio to obtain spectral frequencies of the audio;
   determining, by the electronic device, at least one of an intensity of the spectral frequencies and at least one range of the spectral frequencies;
   receiving, by the electronic device, predefined motion rules including a condition of mapping a range of the spectral frequencies and a type of motion to be applied to the at least one predefined portion;
   identifying, by the electronic device, at least one motion to be performed on the at least one predefined portion of the graphical object; and
   generating, by the electronic device, the at least one motion on the at least one predefined portion of the graphical object by correlating the identified at least one motion with the at least one range of the spectral frequencies based on the condition of mapping included in the predefined motion rules.

2. The method of claim 1, wherein the at least one motion comprises at least one of a rotation motion, a linear motion, a breaking motion, a size expansion motion, a size shrinkage motion, a blurring motion, and a diving motion.

3. The method of claim 1, wherein the identifying of the at least one motion to be performed on the at least one predefined portion of the graphical object comprises:
   receiving, by the electronic device, a reference video;

extracting, by the electronic device, at least one range of spectral frequencies of an audio in the reference video;

determining, by the electronic device, at least one motion of at least one portion of at least one object in the reference video using a machine learning model, wherein the at least one portion of the at least one object in the reference video is similar to the at least one predefined portion of the graphical object; and correlating, by the electronic device, the at least one motion of the at least one portion of the at least one object in the reference video with the at least one range of the spectral frequencies of the audio in the reference video.

4. The method of claim 1, wherein the identifying of the at least one motion to be performed on the at least one predefined portion of the graphical object comprises:

receiving, by the electronic device, a reference audio;

extracting, by the electronic device, at least one range of spectral frequencies of the reference audio; and correlating, by the electronic device, the at least one motion with the at least one range of the spectral frequencies of the reference audio based on the predefined motion rules.

5. An electronic device for animating a graphical object, the electronic device comprising:

a memory;

a processor; and a graphical object motion controller coupled to the memory and the processor, the graphical object motion controller being configured to:

receive the graphical object having at least one predefined portion to animate, receive an audio to obtain spectral frequencies of the audio, determine at least one of an intensity of the spectral frequencies and at least one range of the spectral frequencies, receive predefined motion rules including a condition of mapping a range of the spectral frequencies and a type of motion to be applied to the at least one predefined portion, identify at least one motion to be performed on the at least one predefined portion of the graphical object, and generate the at least one motion on the at least one predefined portion of the graphical object by correlating the identified at least one motion with the at least one range of the spectral frequencies based on the condition of mapping included in the predefined motion rules.

6. The electronic device of claim 5, wherein the at least one motion comprises at least one of a rotation motion, a linear motion, a breaking motion, a size expansion motion, a size shrinkage motion, a blurring motion, and a diving motion.

7. The electronic device of claim 5, wherein the graphical object motion controller is further configured to:

obtain a reference video;

extract at least one range of spectral frequencies of an audio in the reference video;

determine at least one motion of at least one portion of at least one object in the reference video using a machine learning model, wherein the at least one portion of the at least one object in the reference video is similar to the at least one predefined portion of the graphical object; and correlate the at least one motion of the at least one portion of the at least one object in the reference video with the at least one range of the spectral frequencies of the audio in the reference video.

8. The electronic device of claim 5, wherein the graphical object motion controller is further configured to:

obtain a reference audio;

extract at least one range of spectral frequencies of the reference audio; and correlate the at least one motion with the at least one range of the spectral frequencies of the reference audio based on the predefined motion rules.

* * * * *